United States Patent
Sadai et al.

(10) Patent No.: US 9,824,802 B2
(45) Date of Patent: Nov. 21, 2017

(54) FERRITE SINTERED PLATE AND FERRITE SINTERED SHEET

(71) Applicant: TODA KOGYO CORP., Hiroshima-shi, Hiroshima-ken (JP)

(72) Inventors: Makoto Sadai, Otake (JP); Tomohiro Dote, Otake (JP); Yoji Okano, Otake (JP)

(73) Assignee: TODA KOGYO CORP., Hiroshima (JP)

( * ) Notice: Subject to any disclaimer, the term of this patent is extended or adjusted under 35 U.S.C. 154(b) by 0 days.

(21) Appl. No.: 14/439,283

(22) PCT Filed: Oct. 29, 2013

(86) PCT No.: PCT/JP2013/079221
§ 371 (c)(1),
(2) Date: Apr. 29, 2015

(87) PCT Pub. No.: WO2014/069440
PCT Pub. Date: May 8, 2014

(65) Prior Publication Data
US 2015/0302958 A1  Oct. 22, 2015

(30) Foreign Application Priority Data
Oct. 31, 2012  (JP) ................. 2012-240882

(51) Int. Cl.
| | | |
|---|---|---|
| H01F 1/01 | (2006.01) | |
| H01F 1/34 | (2006.01) | |
| C04B 35/26 | (2006.01) | |
| C09J 7/02 | (2006.01) | |

(52) U.S. Cl.
CPC ............. *H01F 1/01* (2013.01); *C04B 35/265* (2013.01); *C09J 7/026* (2013.01); *H01F 1/344* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/6025* (2013.01)

(58) Field of Classification Search
CPC .... H01F 1/01; H01F 1/34; H01F 1/344; C09J 7/026; C04B 35/265; C04B 2235/3272; C04B 2235/3275; C04B 2235/3279; C04B 2235/3281; C04B 2235/3284; C04B 2235/6025
USPC .......................... 428/156, 167, 172
See application file for complete search history.

(56) References Cited

U.S. PATENT DOCUMENTS

| | | | |
|---|---|---|---|
| 8,436,708 B2 | 5/2013 | Tachibana et al. | |
| 2008/0224937 A1 | 9/2008 | Kimura et al. | |
| 2009/0146898 A1 | 6/2009 | Akiho et al. | |
| 2010/0283447 A1 | 11/2010 | Tachibana et al. | |
| 2011/0129641 A1 | 6/2011 | Kimura et al. | |
| 2012/0237728 A1 | 9/2012 | Kimura et al. | |

FOREIGN PATENT DOCUMENTS

| | | | |
|---|---|---|---|
| CN | 1 965 444 | 5/2007 | |
| CN | 101262085 | 9/2008 | |
| CN | 101889319 | 11/2010 | |
| EP | 1 512 668 | 3/2005 | |
| EP | 1 744 398 | 1/2007 | |
| EP | 2 141 137 | 1/2010 | |
| JP | H08-133826 | 5/1996 | |
| JP | H09-63826 | 3/1997 | |
| JP | H09-232124 | 9/1997 | |
| JP | 2005-015293 | 1/2005 | |
| JP | 2005340759 A | * | 12/2005 |
| JP | 2006-174223 | 6/2006 | |
| JP | 2008-252089 | 10/2008 | |
| JP | 2010-285310 | 12/2010 | |
| JP | 2011-097524 | 5/2011 | |

OTHER PUBLICATIONS

Translation of JP 2005-340759.*
International Search Report for PCT/JP2013/079221 dated Dec. 17, 2013, two pages.
Translation of International Preliminary Report on Patentability issued in International Application No. PCT/JP2013/079221 dated May 5, 2015.
European Patent Office, "Communication with Extended European Search Report," issued in connection with European Patent Application No. 13850317.2, dated Feb. 26, 2016.

* cited by examiner

*Primary Examiner* — Catherine A Simone
(74) *Attorney, Agent, or Firm* — Nixon & Vanderhye P.C.

(57) ABSTRACT

The present invention relates to an Ni—Zn—Cu—Co ferrite sintered plate having a composition comprising 45 to 50 mol % of $Fe_2O_3$, 10 to 25 mol % of NiO, 15 to 36 mol % of ZnO, 2 to 14 mol % of CuO and 0.1 to 3.5 mol % of CoO, all of the molar amounts being calculated in terms of the respective oxides, and a ferrite sintered sheet that is provided on a surface thereof with a groove and further with an adhesive layer and/or a protective layer. The ferrite sintered sheet is capable of exhibiting an increased $\mu'$ value of a magnetic permeability while maintaining a small $\mu''$ value of the magnetic permeability.

15 Claims, No Drawings

FERRITE SINTERED PLATE AND FERRITE SINTERED SHEET

This application is the U.S. national phase of International Application No. PCT/JP2013/079221 filed 29 Oct. 2013 which designated the U.S. and claims priority to JP Patent Application No. 2012-240882 filed 31 Oct. 2012, the entire contents of each of which are hereby incorporated by reference.

TECHNICAL FIELD

The present invention relates to a ferrite sintered plate, and a ferrite sintered sheet comprising the ferrite sintered plate and an adhesive layer and/or a protective layer formed on a surface of the ferrite sintered plate.

BACKGROUND ART

Communication equipments such as cellular phones and smart phones are mounted with a system capable of communicating information using a flat coil antenna, such as NFC (near field (radio) communication) and payment system. For the purpose of enhancing a communication sensitivity of these equipments, there has been proposed such an arrangement that a soft magnetic sheet is disposed in the vicinity of the flat coil antenna (Patent Literatures 1, 2 and 3).

CITATION LIST

Patent Literature

Patent Literature 1: Japanese Patent Application Laid-Open (KOKAI) No. 2005-15293
Patent Literature 2: Japanese Patent Application Laid-Open (KOKAI) No. 2008-252089
Patent Literature 3: Japanese Patent Application Laid-Open (KOKAI) No. 2006-174223

SUMMARY OF INVENTION

Technical Problem

In order to reduce a size of the communication equipments and enhance a function thereof, it has been demanded to further improve a communication sensitivity of the flat coil antenna. To this end, it is necessary to increase an inductance of the antenna by increasing a real part ($\mu'$) of a magnetic permeability of the soft magnetic sheet, and to reduce a loss of the antenna by decreasing an imaginary part ($\mu''$) of the magnetic permeability.

A ferrite sintered sheet used as the soft magnetic sheet has such a characteristic that in a communication frequency of 13.56 MHz, as the $\mu'$ of the sheet increases, the $\mu''$ thereof becomes larger. The ferrite sintered sheet actually used has $\mu'$ of about 100 and $\mu''$ of about 5.

In consequence, an object or technical task of the present invention is to provide a ferrite sintered sheet capable of exhibiting an increased $\mu'$ value while maintaining a small $\mu''$ value.

Solution to Problem

The above object or technical task can be achieved by the following aspects of the present invention.

That is, according to the present invention, there is provided an Ni—Zn—Cu—Co ferrite sintered plate having a composition comprising 45 to 50 mol % of $Fe_2O_3$, 10 to 25 mol % of NiO, 15 to 36 mol % of ZnO, 2 to 14 mol % of CuO and 0.1 to 3.5 mol % of CoO, all of the molar amounts being calculated in terms of the respective oxides (Invention 1).

In addition, according to the present invention, there is provided a ferrite sintered sheet comprising the ferrite sintered plate as defined in the above Invention 1, an adhesive layer formed on one surface of the ferrite sintered plate, and a protective layer formed on an opposite surface of the ferrite sintered plate (Invention 2).

Further, according to the present invention, there is provided a ferrite sintered sheet comprising the ferrite sintered plate as defined in the above Invention 1, and adhesive layers respectively formed on opposite surfaces of the ferrite sintered plate (Invention 3).

Furthermore, according to the present invention, there is provided a ferrite sintered sheet comprising the ferrite sintered plate as defined in the above Invention 1, and protective layers respectively formed on opposite surfaces of the ferrite sintered plate (Invention 4).

Also, according to the present invention, there is provided the ferrite sintered sheet as defined in any one of the above Inventions 2 to 4, wherein at least one groove is formed on at least one surface of the ferrite sintered plate (Invention 5).

Also, according to the present invention, there is provided the ferrite sintered sheet as defined in any one of the above Inventions 2 to 4, wherein the ferrite sintered plate is divided into small parts (Invention 6).

Advantageous Effects of Invention

The ferrite sintered plate and the ferrite sintered sheet according to the present invention have a large $\mu'$ value and a small $\mu''$ value, and therefore can be suitably used as a member capable of increasing a communication sensitivity of a system such as NFC.

DESCRIPTION OF EMBODIMENTS

The construction of the present invention is described in detail below.

First, the Ni—Zn—Cu—Co ferrite according to the present invention is described.

The Ni—Zn—Cu—Co ferrite according to the present invention has a composition comprising 45 to 50 mol % of $Fe_2O_3$, 10 to 25 mol % of NiO, 15 to 36 mol % of ZnO, 2 to 14 mol % of CuO and 0.1 to 3.5 mol % of CoO, all of the molar amounts being calculated in terms of the respective oxides.

When the content of $Fe_2O_3$ in the Ni—Zn—Cu—Co ferrite according to the present invention is less than 45 mol %, the $\mu'$ of the ferrite tends to be decreased. When the content of $Fe_2O_3$ in the Ni—Zn—Cu—Co ferrite according to the present invention is more than 50 mol %, it is not possible to sinter the ferrite. The content of $Fe_2O_3$ in the Ni—Zn—Cu—Co ferrite according to the present invention is preferably 46 to 49.8 mol %.

When the content of NiO in the Ni—Zn—Cu—Co ferrite according to the present invention is less than 10 mol %, the $\mu''$ of the ferrite tends to be increased. When the content of NiO in the Ni—Zn—Cu—Co ferrite according to the present invention is more than 25 mol %, the $\mu'$ of the ferrite tends to be decreased. The content of NiO in the Ni—Zn—Cu—Co ferrite according to the present invention is preferably 11 to 23 mol %.

When the content of ZnO in the Ni—Zn—Cu—Co ferrite according to the present invention is less than 15 mol %, the $\mu'$ of the ferrite tends to be decreased. When the content of ZnO in the Ni—Zn—Cu—Co ferrite according to the present invention is more than 36 mol %, the $\mu''$ of the ferrite tends to be increased. The content of ZnO in the Ni—Zn—Cu—Co ferrite according to the present invention is preferably 18 to 33 mol %.

When the content of CuO in the Ni—Zn—Cu—Co ferrite according to the present invention is less than 2 mol %, it is not possible to sinter the ferrite. When the content of CuO in the Ni—Zn—Cu—Co ferrite according to the present invention is more than 14 mol %, the $\mu''$ of the ferrite tends to be increased. The content of CuO in the Ni—Zn—Cu—Co ferrite according to the present invention is preferably 3 to 12 mol %.

When the content of CoO in the Ni—Zn—Cu—Co ferrite according to the present invention is less than 0.1 mol %, the $\mu''$ of the ferrite tends to be increased. When the content of CoO in the Ni—Zn—Cu—Co ferrite according to the present invention is more than 3.5 mol %, the $\mu'$ of the ferrite tends to be decreased. The content of CoO in the Ni—Zn—Cu—Co ferrite according to the present invention is preferably 0.12 to 3.3 mol %, more preferably 0.3 to 3.0 mol %, and still more preferably 0.5 to 1.45 mol %.

The ratio of Ni to $Fe_2O_3$ ($Ni/Fe_2O_3$) in the Ni—Zn—Cu—Co ferrite according to the present invention is preferably 20 to 55 mol %, and more preferably 22 to 55 mol %. The ratio of Zn to $Fe_2O_3$ ($Zn/Fe_2O_3$) in the Ni—Zn—Cu—Co ferrite according to the present invention is preferably 30 to 75 mol %, and more preferably 31 to 65 mol %. The ratio of Cu to $Fe_2O_3$ ($Cu/Fe_2O_3$) in the Ni—Zn—Cu—Co ferrite according to the present invention is preferably 4.0 to 31.0 mol %, more preferably 10 to 31.0 mol %, and still more preferably 19 to 30.5 mol %. In addition, the ratio of Co to $Fe_2O_3$ ($Co/Fe_2O_3$) in the Ni—Zn—Cu—Co ferrite according to the present invention is preferably 0.2 to 7.5 mol %, and more preferably 0.3 to 3.0 mol %.

The thickness of the ferrite sintered plate comprising the Ni—Zn—Cu—Co ferrite according to the present invention is preferably 0.01 to 1 mm, more preferably 0.02 to 1 mm, and still more preferably 0.03 to 0.5 mm. The ferrite sintered plate according to the present invention is basically free from plastic deformation.

The ferrite sintered plate comprising the Ni—Zn—Cu—Co ferrite according to the present invention is provided on at least one surface thereof with an adhesive layer. The thickness of the adhesive layer is preferably 0.001 to 0.1 mm.

The ferrite sintered plate comprising the Ni—Zn—Cu—Co ferrite according to the present invention is provided on at least one surface thereof with a protective layer. The thickness of the protective layer is preferably 0.001 to 0.1 mm.

The $\mu'$ of the ferrite sintered sheet according to the present invention is preferably 80 to 300, more preferably 90 to 290, and still more preferably 110 to 280.

The $\mu''$ of the ferrite sintered sheet according to the present invention is preferably 0.05 to 15, more preferably 0.06 to 10, and still more preferably 0.07 to 5.0.

The adhesive layer of the present invention may be formed of a double-sided adhesive tape. The double-sided adhesive tape is not particularly limited, and any known double-sided adhesive tape may be used as the adhesive layer. In addition, the adhesive layer may be provided on one surface of the ferrite sintered plate in the form of a laminated layer obtained by sequentially laminating an adhesive layer, a bendable and stretchable film or sheet, an adhesive layer and a release sheet on one another.

The provision of the protective layer of the present invention is capable of enhancing a reliability and durability against dusting caused upon dividing the ferrite sintered plate into parts. The protective layer is not particularly limited as long as the protective layer is formed of a resin that can be stretched without breakage when bending the ferrite sintered sheet. Examples of the protective layer include a PET film and the like.

In the ferrite sintered sheet according to the present invention, in order to attach the ferrite sintered sheet to a bent portion and prevent the sheet from breaking upon use, the ferrite sintered plate may have such a structure that the ferrite sintered plate can be divided into parts along at least one groove as a starting point for the division which is previously formed on at least one surface of the ferrite sintered plate. The groove may be formed either continuously or intermittently. In addition, a number of fine recesses may be substituted for the groove. The groove desirably has a U-shape or V-shaped section.

In the ferrite sintered sheet according to the present invention, in order to attach the ferrite sintered sheet to a bent portion and prevent the sheet from breaking upon use, the ferrite sintered plate is preferably previously divided into small parts. For example, there may be mentioned any of the method in which the ferrite sintered plate is divided into parts along at least one groove as a starting point for the division which is previously formed on at least one surface of the ferrite sintered plate, and the method in which the ferrite sintered plate is divided into small parts without forming any groove.

The ferrite sintered plate may be divided into parts having an optional size which may be of a triangle shape, a quadrilateral shape, a polygonal shape or a combination of any two or more of these shapes, along the groove. For example, the length of one side of the triangle shape, quadrilateral shape or polygonal shape is usually 1 to 12 mm. When a member onto which the ferrite sintered sheet is to be attached has a curved surface, the length of one side of the triangle shape, quadrilateral shape or polygonal shape is preferably not less than 1 mm and not more than ⅓ of a radius of curvature of the member, and more preferably not less than 1 mm and not more than ¼ of a radius of curvature of the member. In the case where the groove is formed on the ferrite sintered plate, the ferrite sintered sheet is hardly broken at positions other than the groove, and can be brought into close contact with or substantially close contact with not only a flat surface, but also a curved side surface of a cylindrical body and a slightly irregular surface.

The width of an opening of the groove formed on the ferrite sintered plate is usually preferably not more than 250 μm, and more preferably 1 to 150 μm. When the width of an opening of the groove is more than 250 μm, the ferrite sintered plate tends to suffer from undesirably large deterioration in magnetic permeability. In addition, the depth of the groove is usually ½₀ to ⅗ of the thickness of the ferrite sintered plate. Meanwhile, in the case where the thickness of the ferrite sintered plate is as thin as 0.1 mm to 0.2 mm, the depth of the groove is preferably ½₀ to ¼ of the thickness of the ferrite sintered plate, and more preferably ½₀ to ⅙ of the thickness of the ferrite sintered plate.

Next, the process for producing the ferrite sintered plate and the ferrite sintered sheet according to the present invention is described.

First, the ferrite particles may be produced by pre-calcining a raw material mixture prepared by mixing raw materials such as oxides, carbonates, hydroxides, oxalates, etc., of the respective elements as constituents of the ferrite at a predetermined compositional ratio, or a co-precipitation product prepared by precipitating the respective elements in an aqueous solution thereof, in atmospheric air in a temperature range of 700 to 900° C. for 1 to 20 hr, and then pulverizing the resulting pre-calcined product.

The resulting ferrite particles are mixed with a binder resin, and the resulting mixture is molded into a ferrite plate by a powder compression molding method, an injection molding method, a calendering method, an extrusion method, etc., and the resulting molded product is subjected to sintering treatment, if required, after degreasing treatment, whereby it is possible to obtain the ferrite sintered plate. Alternatively, the ferrite particles, a binder resin and a solvent are mixed with each other, and the resulting mixture is applied onto a film or a sheet using a doctor blade, etc., to obtain a green sheet, and the resulting green sheet is subjected to sintering treatment, if required, after being subjected to degreasing treatment, whereby it is possible to obtain the ferrite sintered plate. Incidentally, a plurality of the obtained green sheets may be laminated on each other.

In the case where the groove is formed on the ferrite sintered plate according to the requirements, it is possible to conduct formation of the groove during or after molding the ferrite plate or after the sintering treatment. For example, when forming the ferrite plate by a powder compression molding method or an injection molding method, it is preferable to form the groove during the molding, whereas when forming the ferrite plate by a calendering method or an extrusion method, it is preferable to form the groove after the molding but before the sintering. In the case where the sintered ferrite plate is produced through the green sheet, it is preferable to form the groove on the green sheet.

The degreasing treatment is usually carried out at a temperature of 150 to 500° C. The sintering temperature is usually 850 to 1100° C., preferably 860 to 1050° C., and more preferably 875 to 905° C. The sintering time is usually 30 to 180 min, and preferably 30 to 120 min. When the sintering temperature is lower than 850° C., it may be difficult to sinter the particles, so that the resulting sintered ferrite plate tends to be insufficient in strength. On the other hand, when the sintering temperature is higher than 1100° C., growth of the particles tends to undesirably proceed. When the sintering time is less than 30 min, it may be difficult to sinter the particles, so that the resulting sintered ferrite plate tends to be insufficient in strength. On the other hand, since a sintering time of 180 min is sufficient to allow the sintering to well proceed, it is not necessary to prolong the sintering time over 180 min.

Next, an adhesive material layer, for example, a double-sided adhesive tape, may be provided on a surface of the resulting ferrite sintered plate, if required. The adhesive material layer may be formed on one surface or opposite surfaces of the ferrite sintered plate.

In addition, a protective layer may be provided on a surface of the resulting ferrite sintered plate, if required. The protective layer may be formed on one surface or opposite surfaces of the ferrite sintered plate. The protective layer may be produced by bonding a film or a sheet of a resin constituting the protective layer onto the surface of the sintered ferrite sintered plate, if required, through an adhesive, or by applying a coating material comprising a resin constituting the protective layer onto the surface of the sintered ferrite plate. When forming the protective layer, it is possible to prevent occurrence of dusting in the ferrite sintered plate.

Also, according to the present invention, the adhesive layer may be formed on one surface of the ferrite sintered plate, and the protective layer may be formed on the opposite surface of the ferrite sintered plate.

When dividing the ferrite sintered plate along the groove, after forming the adhesive layer and/or protective layer thereon, the division of the ferrite sintered plate may be conducted using a roller.

<Function>

The most important point of the present invention resides in such a fact that the ferrite sintered plate or the ferrite sintered sheet comprising the Ni—Zn—Cu—Co ferrite having a specific composition according to the present invention has a high $\mu'$ and a low $\mu''$.

EXAMPLES

Typical embodiments of the present invention are as follows.

The compositions of the Ni—Zn—Cu—Co ferrite was measured using a fluorescent X-ray analyzer "3530" manufactured by Rigaku Denki Kogyo Co., Ltd.

The thickness of each of the ferrite sintered plate and the ferrite sintered sheet was measured using a micrometer.

The magnetic permeability of each of the ferrite sintered plate and the ferrite sintered sheet was determined as follows. That is, the magnetic permeability of a sample punched into a ring shape having an outer diameter of 20 mm and an inner diameter of 10 mm was measured at a frequency of 13.56 MHz using an impedance/material analyzer "E4991A" manufactured by Agerent Technology Co., Ltd.

Example 1

The respective raw material oxides were weighed such that Ni—Zn—Cu—Co ferrite obtained therefrom had a predetermined composition, and wet-mixed with each other for 20 hr using a ball mill. The resulting mixed slurry was filtered to separate a solid component therefrom, and the thus separated solid component was dried to obtain mixed particles as a raw material. The thus obtained mixed particles were calcined at 730° C. for 3 hr, and the resulting pre-calcined product was pulverized using a ball mill, thereby obtaining Ni—Zn—Cu—Co ferrite particles according to the present invention.

Eight parts by weight of polyvinyl butyral as a binder material, 3 parts by weight of benzyl-n-butyl phthalate as a plasticizer and 50 parts by weight of 3-methyl-3-methoxy-1-butanol as a solvent were added to 100 parts by weight of the thus obtained Ni—Zn—Cu—Co ferrite particles, and the resulting mixture was fully mixed to obtain a slurry. The thus obtained slurry was applied onto a PET film using a doctor blade-type coater to form a coating film thereon. The coating film was then dried to obtain a green sheet having a thickness of 400 μm.

Using a blade mold having a V-shaped blade tip, grooves each having a depth of 100 μm were formed in grids at intervals of 3 mm on a surface of the green sheet.

The resulting green sheet was degreased at 400° C., and sintered at 1010° C. for 2 hr, thereby obtaining an Ni—Zn—Cu—Co ferrite sintered plate. The thus obtained ferrite sintered plate had a composition comprising 49.41 mol % of $Fe_2O_3$, 10.17 mol % of NiO, 35.21 mol % of ZnO, 2.09 mol % of CuO and 3.12 mol % of CoO, and a thickness of 328 μm.

A PET film was attached onto one surface of the resulting ferrite sintered plate, and a double-sided tape was attached onto the other surface of the ferrite sintered plate, thereby obtaining a ferrite sintered sheet. The thickness of the resulting ferrite sintered sheet was 390 μm.

The resulting ferrite sintered sheet was divided into parts, and the divided sheet had $\mu'$ of 93 and $\mu''$ of 0.09 as measured at a frequency of 13.56 MHz.

Example 2

The respective raw material oxides were weighed such that Ni—Zn—Cu—Co ferrite obtained therefrom had a predetermined composition, and wet-mixed with each other for 20 hr using a ball mill. The resulting mixed slurry was filtered to separate a solid component therefrom, and the thus separated solid component was dried to obtain mixed particles as a raw material. The thus obtained mixed particles were calcined at 870° C. for 3 hr, and the resulting pre-calcined product was pulverized using a ball mill, thereby obtaining Ni—Zn—Cu—Co ferrite particles according to the present invention.

Eight parts by weight of polyvinyl butyral as a binder material, 3 parts by weight of benzyl-n-butyl phthalate as a plasticizer and 50 parts by weight of 3-methyl-3-methoxy-1-butanol as a solvent were added to 100 parts by weight of the thus obtained Ni—Zn—Cu—Co ferrite particles, and the resulting mixture was fully mixed to obtain a slurry. The thus obtained slurry was applied onto a PET film using a doctor blade-type coater to form a coating film thereon. The coating film was then dried to obtain a green sheet having a thickness of 45 μm.

Using a blade mold having a U-shaped blade tip, grooves each having a depth of 20 μm were formed in grids at intervals of 3 mm on a surface of the green sheet.

The resulting green sheet was degreased at 400° C., and sintered at 870° C. for 2 hr, thereby obtaining an Ni—Zn—Cu—Co ferrite sintered plate. The thus obtained ferrite sintered plate had a composition comprising 45.93 mol % of $Fe_2O_3$, 24.91 mol % of NiO, 15.03 mol % of ZnO, 13.98 mol % of CuO and 0.15 mol % of CoO, and a thickness of 39 μm.

A PET film was attached onto one surface of the resulting ferrite sintered plate, and a double-sided tape was attached onto the other surface of the ferrite sintered plate, thereby obtaining a ferrite sintered sheet. The thickness of the resulting ferrite sintered sheet was 59 μm.

The resulting ferrite sintered sheet was divided into parts, and the divided sheet had $\mu'$ of 272 and $\mu''$ of 4.9 as measured at a frequency of 13.56 MHz.

Example 3

The respective raw material oxides were weighed such that Ni—Zn—Cu—Co ferrite obtained therefrom had a predetermined composition, and wet-mixed with each other for 20 hr using a ball mill. The resulting mixed slurry was filtered to separate a solid component therefrom, and the thus separated solid component was dried to obtain mixed particles as a raw material. The thus obtained mixed particles were calcined at 810° C. for 3 hr, and the resulting pre-calcined product was pulverized using a ball mill, thereby obtaining Ni—Zn—Cu—Co ferrite particles according to the present invention.

Eight parts by weight of polyvinyl butyral as a binder material, 3 parts by weight of benzyl-n-butyl phthalate as a plasticizer and 50 parts by weight of 3-methyl-3-methoxy-1-butanol as a solvent were added to 100 parts by weight of the thus obtained Ni—Zn—Cu—Co ferrite particles, and the resulting mixture was fully mixed to obtain a slurry. The thus obtained slurry was applied onto a PET film using a doctor blade-type coater to form a coating film thereon. The coating film was then dried to obtain a green sheet having a thickness of 245 μm.

Using a blade mold having a V-shaped blade tip, grooves each having a depth of 50 μm were formed in grids at intervals of 3 mm on a surface of the green sheet.

The resulting green sheet was degreased at 400° C., and sintered at 910° C. for 2 hr, thereby obtaining an Ni—Zn—Cu—Co ferrite sintered plate. The thus obtained ferrite sintered plate had a composition comprising 48.29 mol % of $Fe_2O_3$, 11.26 mol % of NiO, 29.43 mol % of ZnO, 9.78 mol % of CuO and 1.25 mol % of CoO, and a thickness of 206 μm.

A PET film was attached onto one surface of the resulting ferrite sintered plate, and a double-sided tape was attached onto the other surface of the ferrite sintered plate, thereby obtaining a ferrite sintered sheet. The thickness of the resulting ferrite sintered sheet was 249 μm.

The resulting ferrite sintered sheet was divided into parts, and the divided sheet had $\mu'$ of 182 and $\mu''$ of 3.6 as measured at a frequency of 13.56 MHz.

As apparently recognized from the above Examples, the ferrite sintered plates and ferrite sintered sheets according to the present invention had a high $\mu'$ and a low $\mu''$, and therefore can be suitably used as a member capable of enhancing a communication sensitivity.

Examples 4 to 7

The same procedure as in Example 1 was conducted except that the composition and sintering temperature were changed variously, thereby obtaining ferrite sintered sheets.

Comparative Example 1

The respective raw material oxides were weighed such that Ni—Zn—Cu ferrite obtained therefrom had a predetermined composition, and wet-mixed with each other for 20 hr using a ball mill. The resulting mixed slurry was filtered to separate a solid component therefrom, and the thus separated solid component was dried to obtain mixed particles as a raw material. The thus obtained mixed particles were calcined at 780° C. for 3 hr, and the resulting pre-calcined product was pulverized using a ball mill, thereby obtaining Ni—Zn—Cu ferrite particles.

Eight parts by weight of polyvinyl butyral as a binder material, 3 parts by weight of benzyl-n-butyl phthalate as a plasticizer and 50 parts by weight of 3-methyl-3-methoxy-1-butanol as a solvent were added to 100 parts by weight of the thus obtained Ni—Zn—Cu ferrite particles, and the resulting mixture was fully mixed to obtain a slurry. The thus obtained slurry was applied onto a PET film using a doctor blade-type coater to form a coating film thereon. The coating film was then dried to obtain a green sheet having a thickness of 203 μm.

Using a blade mold having a V-shaped blade tip, grooves each having a depth of 80 μm were formed in grids at intervals of 3 mm on a surface of the green sheet.

The resulting green sheet was degreased at 400° C., and sintered at 900° C. for 2 hr, thereby obtaining an Ni—Zn—

Cu ferrite sintered plate. The thus obtained ferrite sintered plate had a composition comprising 48.02 mol % of $Fe_2O_3$, 18.04 mol % of NiO, 25.96 mol % of ZnO and 7.98 mol % of CuO, and a thickness of 172 μm.

A PET film was attached onto one surface of the resulting ferrite sintered plate, and a double-sided tape was attached onto the other surface of the ferrite sintered plate, thereby obtaining a ferrite sintered sheet. The thickness of the resulting ferrite sintered sheet was 211 μm.

The resulting ferrite sintered sheet was divided into parts, and the divided sheet had μ' of 193 and μ" of 54.2 as measured at a frequency of 13.56 MHz.

Various properties of the ferrite sintered plates obtained in Examples 1 to 7 and Comparative Example 1 are shown in Table 1.

TABLE 1

| No. | $Fe_2O_3$ [mol %] | NiO [mol %] | ZnO [mol %] | CuO [mol %] | CoO [mol %] |
|---|---|---|---|---|---|
| Example 1 | 49.41 | 10.17 | 35.21 | 2.09 | 3.12 |
| Example 2 | 45.93 | 24.91 | 15.03 | 13.98 | 0.15 |
| Example 3 | 48.29 | 11.26 | 29.43 | 9.78 | 1.25 |
| Example 4 | 49.38 | 13.08 | 25.10 | 11.18 | 1.26 |
| Example 5 | 47.87 | 19.47 | 22.86 | 9.24 | 0.56 |
| Example 6 | 48.17 | 17.67 | 23.39 | 10.45 | 0.32 |
| Example 7 | 49.67 | 15.40 | 24.59 | 9.91 | 0.43 |
| Comparative Example 1 | 48.02 | 18.04 | 25.96 | 7.98 | — |

| No. | Sintering temperature [° C.] | Plate thickness [μm] | Sheet thickness [μm] | μ' | μ" |
|---|---|---|---|---|---|
| Example 1 | 1010 | 328 | 390 | 93 | 0.09 |
| Example 2 | 870 | 39 | 59 | 272 | 4.9 |
| Example 3 | 910 | 206 | 249 | 182 | 3.6 |
| Example 4 | 905 | 101 | 120 | 187 | 3.7 |
| Example 5 | 900 | 61 | 81 | 141 | 2.2 |
| Example 6 | 890 | 315 | 374 | 124 | 1.4 |
| Example 7 | 875 | 23 | 33 | 99 | 0.8 |
| Comparative Example 1 | 900 | 172 | 211 | 193 | 54.2 |

INDUSTRIAL APPLICABILITY

The ferrite sintered plate and ferrite sintered sheet according to the present invention have a large μ' and a low μ", and therefore can be suitably used as a member capable of enhancing a communication sensitivity of a system such as NFC.

The invention claimed is:

1. A ferrite sintered sheet consisting of a ferrite sintered plate, an adhesive layer formed on one surface of the ferrite sintered plate, and a protective layer formed on an opposite surface of the ferrite sintered plate, wherein the ferrite sintered plate consists of a Ni—Zn—Cu—Co ferrite having a composition comprising 45 to 50 mol % of $Fe_2O_3$, 10 to 25 mol % of NiO, 15 to 36 mol % of ZnO, 2 to 14 mol % of CuO and 0.1 to 3.5 mol % of CoO, all of the molar amounts being calculated in terms of the respective oxides.

2. The ferrite sintered sheet according to claim 1, wherein at least one groove is formed on at least one surface of the ferrite sintered plate.

3. The ferrite sintered sheet according to claim 1 wherein the ferrite sintered plate is divided into small parts.

4. The ferrite sintered sheet according to claim 1, wherein the ferrite sintered sheet has a μ' of 80 to 300 and a μ" of 0.05 to 15.

5. The ferrite sintered sheet according to claim 1, wherein the adhesive layer is formed of a double-sided adhesive tape.

6. A ferrite sintered sheet consisting of a ferrite sintered plate, and adhesive layers respectively formed on opposite surfaces of the ferrite sintered plate, wherein the ferrite sintered plate consists of a Ni—Zn—Cu—Co ferrite having a composition comprising 45 to 50 mol % of $Fe_2O_3$, 10 to 25 mol % of NiO, 15 to 36 mol % of ZnO, 2 to 14 mol % of CuO and 0.1 to 3.5 mol % of CoO, all of the molar amounts being calculated in terms of the respective oxides.

7. The ferrite sintered sheet according to claim 6, wherein the ferrite sintered sheet has a μ' of 80 to 300 and a μ" of 0.05 to 15.

8. The ferrite sintered sheet according to claim 6, wherein the adhesive layer is formed of a double-sided adhesive tape.

9. The ferrite sintered sheet according to claim 6, wherein at least one groove is formed on at least one surface of the ferrite sintered plate.

10. The ferrite sintered sheet according to claim 6, wherein the ferrite sintered plate is divided into small parts.

11. A ferrite sintered sheet consisting of a ferrite sintered plate, and protective layers respectively formed on opposite surfaces of the ferrite sintered plate, wherein the ferrite sintered plate consists of a Ni—Zn—Cu—Co ferrite having a composition comprising 45 to 50 mol % of $Fe_2O_3$, 10 to 25 mol % of NiO, 15 to 36 mol % of ZnO, 2 to 14 mol % of CuO and 0.1 to 3.5 mol % of CoO, all of the molar amounts being calculated in terms of the respective oxides.

12. The ferrite sintered sheet according to claim 11, wherein the ferrite sintered sheet has is μ' of 80 to 300 and μ" of 0.05 to 15.

13. The ferrite sintered sheet according to claim 11, wherein the adhesive layer is formed of a double-sided adhesive tape.

14. The ferrite sintered sheet according to claim 11, wherein at least one groove is formed on at least one surface of the ferrite sintered plate.

15. The ferrite sintered sheet according to claim 11, wherein the ferrite sintered plate is divided into small parts.

* * * * *